US007350003B2

(12) United States Patent
Gish et al.

(10) Patent No.: US 7,350,003 B2
(45) Date of Patent: Mar. 25, 2008

(54) METHOD, SYSTEM, AND APPARATUS FOR AN ADAPTIVE WEIGHTED ARBITER

(75) Inventors: David W. Gish, Riverdale, NJ (US); Don V. Massa, Paterson, NJ (US)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 10/671,971

(22) Filed: Sep. 25, 2003

(65) Prior Publication Data

US 2005/0071210 A1 Mar. 31, 2005

(51) Int. Cl.

| | |
|---|---|
| ***G06F 12/00*** | (2006.01) |
| ***G06F 3/00*** | (2006.01) |
| ***G06F 13/36*** | (2006.01) |
| ***G06F 13/14*** | (2006.01) |
| ***G06F 13/38*** | (2006.01) |
| ***G06F 5/00*** | (2006.01) |
| ***G06F 13/362*** | (2006.01) |

(52) U.S. Cl. ........................ 710/241; 710/41; 710/116; 710/244

(58) Field of Classification Search ................ 710/244, 710/40–42, 111, 116, 240–241
See application file for complete search history.

(56) References Cited

U.S. PATENT DOCUMENTS

| | | | | | |
|---|---|---|---|---|---|
| 5,935,234 | A * | 8/1999 | Arimilli et al. | | 710/244 |
| 6,032,218 | A * | 2/2000 | Lewin et al. | | 710/240 |
| 6,073,132 | A * | 6/2000 | Gehman | | 707/9 |
| 6,138,197 | A * | 10/2000 | Cheng | | 710/117 |
| 6,246,256 | B1 * | 6/2001 | Liu et al. | | 326/38 |
| 6,363,445 | B1 * | 3/2002 | Jeddeloh | | 710/113 |
| 6,385,678 | B2 * | 5/2002 | Jacobs et al. | | 710/113 |
| 6,516,369 | B1 * | 2/2003 | Bredin | | 710/111 |
| 6,629,177 | B1 * | 9/2003 | Chong | | 710/240 |
| 6,915,369 | B1 * | 7/2005 | Dao et al. | | 710/305 |
| 6,961,793 | B2 * | 11/2005 | Kato | | 710/113 |
| 7,143,219 | B1 * | 11/2006 | Chaudhari et al. | | 710/111 |
| 2004/0210695 | A1 * | 10/2004 | Weber et al. | | 710/240 |

FOREIGN PATENT DOCUMENTS

JP 10-254823 * 3/1997

OTHER PUBLICATIONS

Hwang et al., "An Implementation and Performance Analysis of Slave-Side Arbitration Schemes for the ML-AHB BusMatrix", Mar. 11-15, 2007, ACM, Proceedings of the 2007 ACM Symposium on Applied Computing SAC '07, pp. 1545-1551.*

(Continued)

*Primary Examiner*—Mark H. Rinehart
*Assistant Examiner*—Faisal Zaman
(74) *Attorney, Agent, or Firm*—Trop, Pruner & Hu, P.C.

(57) ABSTRACT

An adaptive weighted arbitration algorithm that is user configurable is discussed. The arbitration logic and algorithm considers past arbitration history events and is dynamic to allow for losing bidders to increase their probability of being selected to access the resource based on an accumulator value and a weight value.

14 Claims, 2 Drawing Sheets

OTHER PUBLICATIONS

Chen et al., "A Real-Time and Bandwidth Guaranteed Arbitration Algorithm for SoC Bus Communication", Jan. 2006, IEEE Press, Proceedings of the 2006 Conference on Asia South Pacific Design Automation, pp. 600-605.*

Ouaiss et al., "Efficient Resource Arbitration in Reconfigurable Computing Environments", Jan. 2000, ACM, Proceedings of the Conference on Design, Automation, and Test in Europe, pp. 560-566.*

* cited by examiner

METHOD, SYSTEM, AND APPARATUS FOR AN ADAPTIVE WEIGHTED ARBITER

BACKGROUND

1. Field

The present disclosure pertains to the field of computer chip design. More particularly, the present disclosure pertains to a new method, system, and apparatus for an adaptive weighted arbiter.

2. Description of Related Art

Typically, electronic systems include an arbitration logic for arbitrating between requests received from the multiple requesting agents, and for granting access to a resource to a selected one of the requesting agents. For example, a requesting agent may be a modem, keyboard, video controller, serial port, or PCMCIA card, SONET interface, Ethernet Interface, content processor, encryption device, or compression device and a resource may be an interconnect bus, memory unit, or output buffer. In some situations, such as, peer-to-peer systems, the device may be either the requesting agent and/or the arbitrated resource.

Present arbitration schemes include round-robin arbiters that are based at least in part on a scheduling algorithm that creates a list of all possible requesting agents ("bidders"). Next, the arbiter assigns a window of time fixed bidding opportunities for each bidder into a table. The arbiter then traverses the table and determines whether the particular bidder is requesting access to the resource. If so, the arbiter grants access to that particular bidder. Otherwise, the arbiter proceeds to the next bidder in the list entry in the table. However, the present round-robin arbiter does not account for past arbitration events. Furthermore, a fixed scheduling algorithm may require bidders to wait for their particular window of time ("time slice") fixed bidding opportunity in the table.

BRIEF DESCRIPTION OF THE FIGURES

The present invention is illustrated by way of example and not limitation in the Figures of the accompanying drawings.

DETAILED DESCRIPTION

The following description provides method and apparatus for improved multi-core processor performance despite power constraints. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, a problem exists for round robin arbiters. In contrast to the prior art, the claimed subject matter facilitates a novel adaptive weighted arbitration algorithm that is user configurable. Also, the claimed subject matter allows the arbiter to consider past arbitration history events and is dynamic to allow for losing bidders to increase their probability of being selected to access the resource. The arbitration algorithm, circuitry, and system will be discussed further in connection with FIGS. 1-3.

Figure 1:
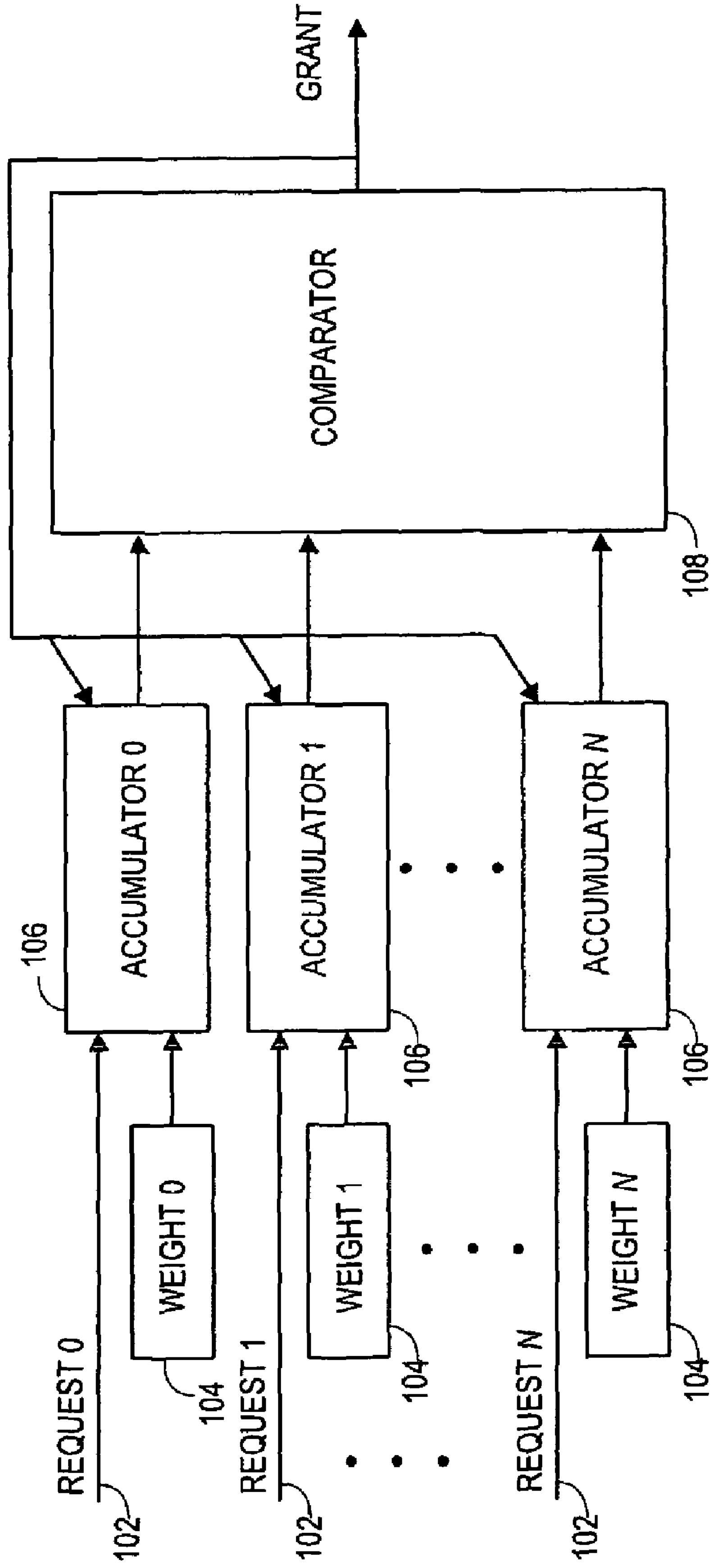
FIG. 1 illustrates a schematic diagram utilized in accordance with an embodiment.

FIG. 1 illustrates a schematic diagram utilized in accordance with an embodiment. In one embodiment, the schematic depicts an adaptive weighted arbiter. In another embodiment, the adaptive weighted arbiter may be utilized as an adaptive weighted round-robin arbiter. In various embodiments, the arbiter may be incorporated within a chipset, a microcontroller, application specific integrated circuit (ASIC), or a processor. Also, the respective weight and accumulator values are flexible because they are user configurable and may be stored in the respective register depicted as 104 for the weight value and account for past bidding win/loss history or within the accumulator 106.

The schematic includes a plurality of accumulators 106 that receive a plurality of requests 102 from bidders. In one embodiment, a plurality of n bidders is requesting access to a resource. A comparator is coupled to the plurality of accumulators 106 and generates a grant to one of the bidders based at least in part on a plurality of accumulator values stored within each accumulator.

In one embodiment, each accumulator stores a single accumulator value and the accumulator value is based at least in part on a user configurable weight value 104. In this same embodiment, the user configurable weight value corresponds to a desired priority for each of the n bidders. For example, in one embodiment, a bidder with a weight value of one indicates a highest priority among the bidders, a bidder with a weight value of two indicates a second highest priority among bidders, etc. . . .

A more detailed explanation of the weighted values, accumulator values, and algorithm will be discussed in connection with FIG. 2.

Figure 2:
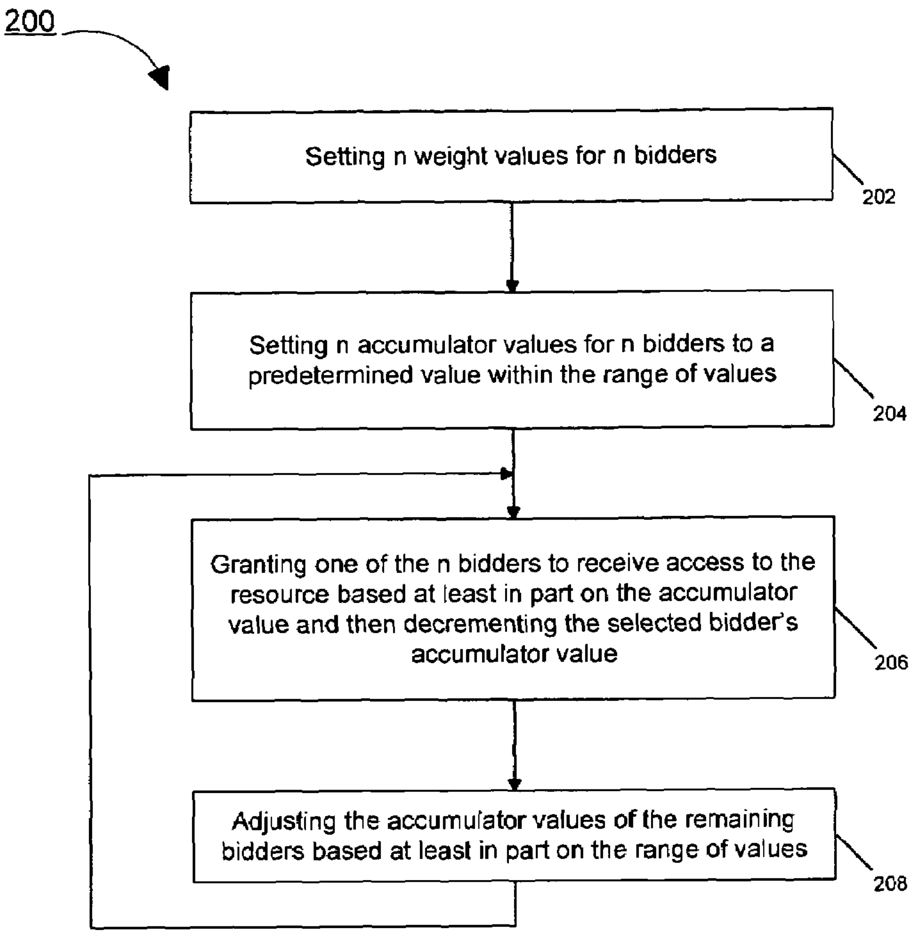
FIG. 2 illustrates a flowchart for a method utilized in accordance with an embodiment.

FIG. 2 illustrates a flowchart for a method utilized in accordance with an embodiment. In one embodiment, the flowchart depicts a method for an adaptive weight arbitration algorithm that may be implemented in software to control the arbitration logic.

The flowchart depicts one arbitration cycle and may be repeated for subsequent arbitration cycles.

The claimed subject matter facilitates the adaptive weighted arbitration logic by setting n weight values for n bidders, as depicted in a block 202. For example, in one embodiment, the weight value is based on a priority of each of the n bidders. Also, the algorithm will set n accumulator values for n bidders to a predetermined value within a range of values, as depicted in a block 204. For example, in one embodiment, the predetermined value is at a midpoint of a particular accumulator's range. In one embodiment, all the accumulators will have the same range. Typically, the range will be a power of 2, such as, 8, 16, 32, 64, 128, etc. For example, an user may select a range based at least in part the desired granularity(accuracy).

For each arbitration cycle, the algorithm declares a winner for one of the n bidders and grants the winning bidder access to the resource based at least in part on the accumulator value, as depicted in a block 206. For example, in one embodiment, the winning bidder has the highest accumulator value as determined by the comparator described in connection with FIG. 1. Also, the arbiter algorithm decrements the accumulator value of the winning bidder. For example, the algorithm may decrement the winning bidder's accumulator value by the amount of the bidder's weight value. However, if decrementing the winning bidder's accumulator value would result in a negative value, then, the accumulator value is set to zero.

In one embodiment, the remaining bidders that were contending for the resource during the particular arbitration cycle ("losing bidders") have their respective accumulator values incremented after the winning bidder has been determined, as depicted in a block 208. For example, a losing bidder with an accumulator value between 0-25% quartile of their range will have their respective accumulator value increased by a value of four; a losing bidder with an accumulator value between 25-50% quartile of their range will have their respective accumulator value increased by a value of three; a losing bidder with an accumulator value between 50-75% quartile of their range will have their respective accumulator value increased by a value of two; and a losing bidder with an accumulator value between 75-99% quartile of their range will have their respective accumulator value increased by a value of one. Therefore, the claimed subject matter allows the arbiter to consider past arbitration history events and is dynamic to allow for losing bidders to increase their probability of being selected to access the resource.

However, the claimed subject matter is not limited to the preceding quartiles and increment and decrement values. For example, one skilled in the art appreciates utilizing different increment values and quartile values.

In some embodiments, an accumulator value is unchanged for a losing bidder with an accumulator value at 100% of its respective range.

In one embodiment that supports multiple request/grant interactions, the flowchart depicts a line from 208 back to 206.

Figure 3:
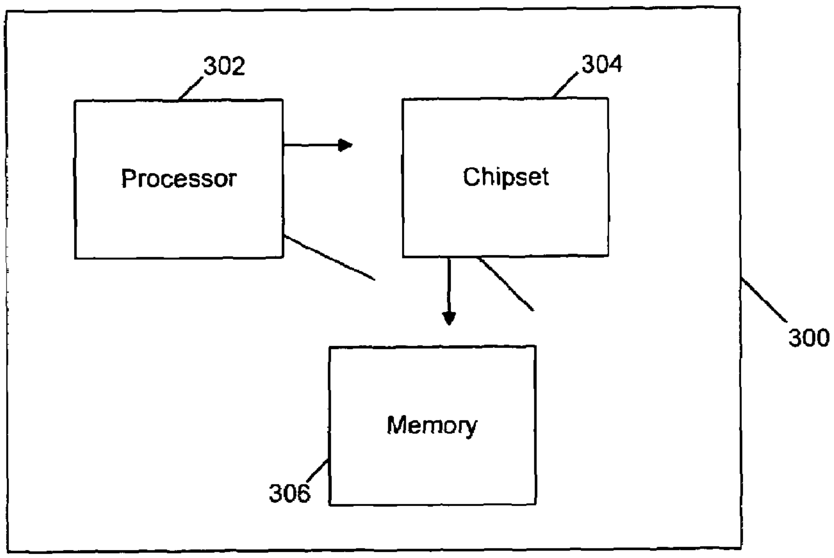
FIG. 3 illustrates a system in accordance with one embodiment.

FIG. 3 illustrates a system in accordance with one embodiment. The system in one embodiment is a processor 302 that is coupled to a chipset 304 that is coupled to a memory 306. For example, the chipset performs and facilitates various operations, such as, memory transactions between the processor and memory. In one embodiment, the system comprises one or all of the previous embodiments for an arbitration algorithm depicted in connection with FIGS. 1-2. For example, the system may be coupled to a variety of requesting devices and arbitrated resources (as previously described) and incorporates the arbitration schematic and methods described earlier to arbitrate access between the requesting agents and the arbitrated resource.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for arbitrating a resource comprising:

setting n weight values for n bidders in a corresponding one of n registers;

setting n accumulator values for the n bidders in a corresponding one of n accumulators, wherein the n accumulator values are based at least in part on the n weight value;

granting one of the n bidders access to the resource based at least in part on the accumulator value, and then decrementing the selected bidder's accumulator value in the selected bidder's accumulator; and incrementing the accumulator value in the n−1 losing bidders' accumulators by one of a plurality of predetermined values, each of the predetermined values based on the accumulator value with respect to one of a plurality of portions of a range of accumulator values in which the corresponding n−1 losing bidder's accumulator value is present wherein a probability of the n−1 losing bidders for accessing the resource is increased based on a respective standing of the accumulator value within the accumulator values for the n−1 losing bidders, wherein the range of accumulator values is based on a quartile, the accumulator value is incremented by one if the accumulator value is within 76-99% of the range, the accumulator value is incremented by two if the accumulator value is within 51-75% of the range, the accumulator value is incremented by three if the accumulator value is within 26-50% of the range, the accumulator value is incremented by four if the accumulator value is within 0-25% of the range.

2. The method of claim 1 wherein the accumulator values are initially set to a midpoint of the range of accumulator values.

3. The method of claim 1, further comprising decrementing the selected bidder's accumulator value by a variable amount corresponding to the weight value for the selected bidder, or zero if the resulting accumulator value would be less than zero.

4. The method of claim 1, further comprising enabling a user to set the n weight values and the n accumulator values.

5. An apparatus to arbitrate access to a resource comprising:

a plurality of n registers to store n weight values;

a plurality of n accumulators to each receive a request to the resource and to accumulate and store n accumulator values wherein the n accumulator values are based at least in part on the n weight values;

a comparator, coupled to the plurality of accumulators, to grant access to one of the requests based at least in part on the past history of granted requests and then accumulator values, wherein each accumulator is to increment or decrement the accumulator value on a per arbitration cycle basis in response to the grant access by the comparator, wherein the past history of granted requests is based on the accumulator's value being incremented if it was not granted access and is based on a quartile analysis as follows: the accumulator value is incremented by one if the accumulator value is within 76-99% of a range for the corresponding accumulator, the accumulator value is incremented by two if the accumulator value is within 51-75% of the range, the accumulator value is incremented by three if the accumulator value is within 26-50% of the range, the accumulator value is incremented by four if the accumulator value is within 0-25% of the range.

6. The apparatus of claim 5 wherein the comparator is to decrement the accumulator value of the accumulator that was granted access to their request in an amount corresponding to the n weight value associated with the accumulator if the resulting accumulator value would be greater than or equal to zero, otherwise the comparator is to decrement the accumulator value to zero.

7. The apparatus of claim 6 wherein the weight value for each accumulator is initially set according to a priority of the request.

8. The apparatus of claim 5 wherein a bidder that is to provide the request is either one of a modem, keyboard, video controller, serial port, or PCMCIA card, SONET interface, Ethernet Interface, content processor, encryption device, or compression device.

9. The apparatus of claim 5 wherein the resource may be an interconnect bus, memory text, or output buffer.

10. The apparatus of claim 5, wherein each of the plurality of n registers is coupled to a corresponding one of the plurality of n accumulators.

11. The apparatus of claim 5, wherein the n weight values and the n accumulator values are to be user configured.

12. An article comprising a storage medium storing instructions that, when executed result in:

arbitrating a resource among a plurality of bidders, each one of the bidders with an accumulator value; and granting one of the plurality of bidders access to the resource based at least in part on the accumulator value, and then decrementing the selected bidder's accumulator value, and incrementing the accumulator value by a variable amount for the n−1 losing bidders, the variable amount based on a quartile analysis of the accumulator value with respect to a range of values for the accumulator value, wherein the accumulator value is incremented by a first value if the accumulator value is within a first quartile, the accumulator value is incremented by a second value if the accumulator value is within a second quartile, the accumulator value is incremented by a third value if the accumulator value is within a third quartile, and the accumulator value is incremented by a fourth value if the accumulator value is within a fourth quartile.

13. The article of claim 12 further comprising setting weight values for the plurality of bidders, wherein the weight values are initially set to a priority of each of the plurality of bidders.

14. A system comprising:

a processor;

a dynamic random access memory, coupled to the processor;

a plurality of bidders to access a resource;

an arbitration logic with a plurality of n registers to store n weight values to be configured by a user;

a plurality of n accumulators to accumulate and store n accumulator values and to each receive a request from the plurality of bidders, wherein the n accumulator values are based at least in part on the n weight values and initial values of the n accumulator values are to be configured by the user;

a comparator, coupled to the plurality of n accumulators, to grant access to one of the requests based at least in part on the past history of granted requests and the n accumulator values, wherein the arbitration logic is to decrement the accumulator value of the accumulator associated with the bidder that was granted access to its request in an amount corresponding to the weight value of the corresponding bidder if the resulting accumulator value would be greater than or equal to zero, otherwise the arbitration logic is to decrement the accumulator value to zero, wherein the arbitration logic is to perform a quartile analysis on each of the losing bidders such that the accumulator value associated with each of the losing bidders is incremented by one if the accumulator value is within 76-99% of a range for the corresponding accumulator, the accumulator value is incremented by two if the accumulator value is within 51-75% of the range, the accumulator value is incremented by three if the accumulator value is within 26-50% of the range, the accumulator value is incremented by four if the accumulator value is within 0-25% of the range.

* * * * *

UNITED STATES PATENT AND TRADEMARK OFFICE

CERTIFICATE OF CORRECTION

PATENT NO. : 7,350,003 B2
APPLICATION NO. : 10/671971
DATED : March 25, 2008

INVENTOR(S) : David W. Gish and Don V. Massa

It is certified that error appears in the above-identified patent and that said Letters Patent is hereby corrected as shown below:

In Column 4:
Line 3, after “present” insert --,--;
Line 33, after “values” insert --,--;
Line 37, “then” should be --then n--.

In Column 5:
Line 2, “text” should be --unit--.

Signed and Sealed this

Eighth Day of July, 2008

JON W. DUDAS
*Director of the United States Patent and Trademark Office*